Jan. 16, 1934.  R. M. G. PHILLIPS  1,943,927
FASTENING FOR AUTOMOBILE HOODS
Filed April 16, 1931
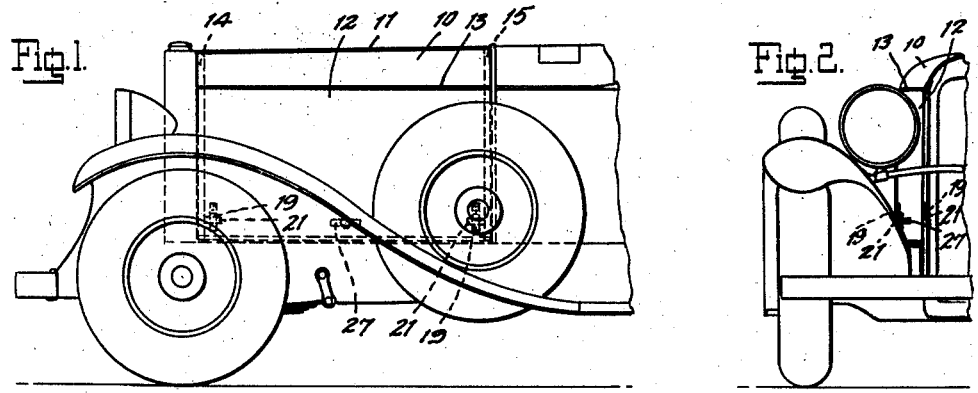
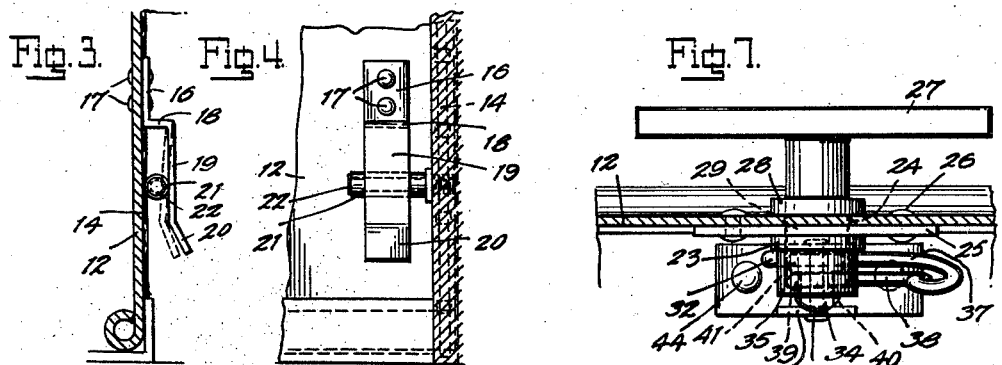
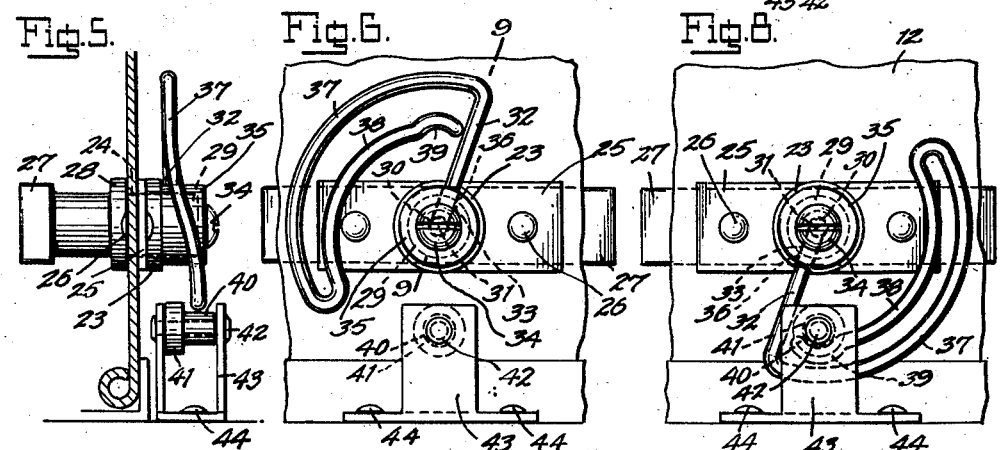
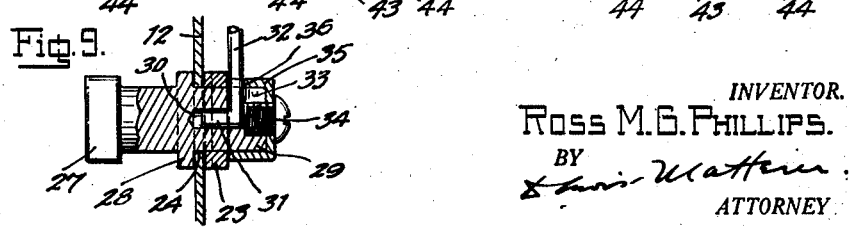
INVENTOR.
Ross M. G. Phillips.
BY
ATTORNEY Patented Jan. 16, 1934

1,943,927

UNITED STATES PATENT OFFICE 1,943,927

FASTENING FOR AUTOMOBILE HOODS

Ross M. G. Phillips, West Haven, Conn., assignor to The Bassick Company, Bridgeport, Conn., a corporation of Connecticut Application April 16, 1931. Serial No. 530,463

2 Claims. (Cl. 292—241)

The present invention relates to improvements in fastening for automobile hoods, and has for an object to provide means which may be operated with great facility to raise and lower the hood and which will effectually retain the same against looseness and rattling. It is particularly proposed to provide a fastening means which will necessitate substantial vertical raising and lowering of the hood so that it will not be swung outwardly into contact with the fender, this being especially advantageous where the sides of the fender are very near the hood. It is also proposed to provide fastening means which will securely hold the hood at its ends and will be manually operated at a point between the ends, enabling the fender to be brought in close to the hood and permitting operation without interference of the fender, or a spare tire, when such tire is carried at the side.

With the above and other objects in view embodiments of the invention are shown in the accompanying drawing and these embodiments will be hereinafter more fully described with reference thereto, and the invention will be finally pointed out in the claims.

In the drawing:

Fig. 1 is a side elevation of the forward end of an automobile and showing the hood provided with fastening means according to one embodiment of the invention.

Fig. 2 is a fragmentary front view.

Fig. 3 is a side elevation of one of the hood end fastening means, the hood being shown in vertical section.

Fig. 4 is a rear elevation of the same.

Fig. 5 is a side elevation of the central fastening means in inoperative or disengaged position, the hood being shown in vertical section.

Fig. 6 is a rear elevation, also in inoperative or disengaged position.

Fig. 7 is a plan view in operative or engaged relation the hood being shown in horizontal section.

Fig. 8 is a rear elevation, also in operative or engaged position.

Fig. 9 is a detail sectional view, taken along the line 9—9 of Fig. 6.

Similar reference characters indicate corresponding parts throughout the several figures of the drawing.

Referring to the drawing, each side of the hood comprises an upper section 10 hinged at 11 and a side section 12 hinged to the section 10 at 13 and adapted in its closed position to be drawn against the usual lacings upon the radiator and cowl, and indicated at 14 and 15, Fig. 1.

At each end and near the lower edge the hood section 12 is provided upon its inner side with a fastening device adapted to be engaged through lowering the hood substantially vertically and to be disengaged through raising it substantially vertically, and which in the engaged relation securely holds the hood inwardly, and at a point substantially midway between the end fastening devices there is provided a catch device adapted to be manually operated to engaged and disengaged relation and which in the engaged relation holds the hood downwardly and inwardly.

As shown in Figs. 1 to 4 the end fastening devices each comprise a spring member having an attaching portion 16 adapted to be secured, as by rivets 17, to the inner side of the hood, being bent inwardly from the lower end of the portion 16, as at 18, and downwardly from said portion 18 to form a spring arm 19, the lower end portion 20 of which is bent at an inclined angle to form an entrance guide and camming surface.

A horizontal keeper bar 21, preferably having a rotatable outer sleeve or roller 22, is provided for each of the hood end fastening devices, being secured interiorly of the hood to the radiator frame at one end and to the cowl front at the other end, and is so positioned as to enter between the arm 19 and the hood in the closed position of the latter, engaging said arm under spring pressure and through such pressure drawing the hood inwardly against the lacing. The dotted lines, Fig. 3 indicate the unsprung position of the arm 19 before engaging the keeper bar.

While the central hood catch device may be of any desirable type to retain and hold the hood downwardly, I have shown a novel type of rotatable catch having an outside handle, adapted for raising and lowering the hood, and inside means adapted to hold the hood downwardly and inwardly.

The catch device, as shown in Figs. 5 to 9, comprises a cylindrical hub member 23, the opening of which is adapted to register with an opening 24 in the hood, integral ears 25 extending at each side of the hub and adapted to be secured to the hood at the inner side, as by rivets 26.

The handle 27 is provided with a flange 28, disposed at the outer side of the hood and closing the hood opening 24, and a cylindrical shank 29, rotatably engaged in the hub 23 and projecting inwardly therefrom. An axial passage 30 is provided in the hub for receiving the bent end 31 of the radial arm 32 of the spring catch member, said arm extending through a radial slot 33 in the hub, and being retained by a set screw 34 screwed into the end of the shank, and which also secures a retaining cap 35 mounted upon the end of the shank and bearing against the hub 23, a notch 36 being formed in the edge of said cap through which the arm 32 extends.

At the outer end of the arm 32, the spring catch member is bent into arcuate form, as at 37, and is thereupon bent back upon itself, as at 38, this portion 38 being springy. The arc of the portion 37 is concentric to the axis of the shank 29, while the arc of the portion 38 is eccentric in the inoperative position shown in Fig. 6, so that its recessed detent end 39 is adapted in the engaged relation with the keeper to be pressed outwardly under spring pressure, and as will presently more fully appear.

The keeper comprises a roller 40, having a shoulder 41 at its outer end, and mounted upon a pin 42 supported in the sides of a U-shaped bracket 43 secured to the automobile frame, as by rivets 44.

As shown in Figs 5 and 6, the bight between the portions 37 and 38 of the spring catch member is bent into an inwardly offset plane, in line with the reduced portion of the roller and inwardly of the shoulder 41, and the detent end is in a plane outwardly of the shoulder.

As the spring catch is turned into engagement with the keeper the arm 38 is depressed under spring tension, so that it exerts a downward pull on the hood, and at the same time the detent end 39 is forced inwardly, so that it bears against the shoulder 41 under spring tension and exerts an inward pull on the hood, as indicated in Figs. 7 and 8.

The operation is as follows:—

In closing the hood the same is brought in close to the lacings by means of the handle 27, so that it can be moved substantially vertically into closed position. The cam portion 20 of the spring arm 19, at each end, first engages the keeper bar 21 guiding the same into the space between the hood and said arm, which is sprung from the dotted line position, Fig. 3, to the full line position, in which it is under spring tension and draws the hood inwardly against the lacings. The hood being then held at the ends, the center catch device is turned from its inoperative position, Figs. 5 and 6, to its operative position, Figs. 7 and 8, thereby retaining the hood closed and exerting a downward and inward pull on the same. In order to lift the hood the center catch device is disengaged from the keeper, and the hood thereupon lifted by means of the catch handle 27, the end fastening means being such as to prevent outward swinging movement until the hood has been raised substantially vertically to a sufficient extent to clear the fender.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. Fastening means for automobile hoods comprising bearing means carried by the hood, rotary means journaled in said bearing means, a handle adapted to rotate said rotary means disposed exteriorly of the hood and an arcuate yieldable spring member carried by said rotary means disposed interiorly of the hood, and a non-yieldable keeper adapted to be engaged by said spring member upon rotation of said handle, said spring member adapted to be tensioned through said engagement to hold the hood downwardly.

2. Fastening means for automobile hoods comprising bearing means carried by the hood, rotary means journaled in said bearing means, a handle adapted to rotate said rotary means disposed exteriorly of the hood and an arcuate spring member carried by said rotary means disposed interiorly of the hood and yieldable vertically and laterally, and a keeper adapted to be engaged by said spring member upon rotation of said handle, said spring member adapted to be tensioned and sprung laterally through said engagement to hold the hood downwardly and inwardly.

ROSS M. G. PHILLIPS.